US012221708B2

(12) United States Patent
Huck et al.

(10) Patent No.: US 12,221,708 B2
(45) Date of Patent: Feb. 11, 2025

(54) SELF-CLEANING ANODE FOR CATHODIC PROTECTION SYSTEMS, CATHODIC PROTECTION SYSTEMS INCLUDING THE SAME, AND METHODS OF USE

(71) Applicant: Matcor, Inc., Chalfont, PA (US)

(72) Inventors: Theodore Andrew Huck, Berwyn, PA (US); Kevin Groll, Lansdale, PA (US)

(73) Assignee: Matcor, Inc., Chalfont, PA (US)

( * ) Notice: Subject to any disclaimer, the term of this patent is extended or adjusted under 35 U.S.C. 154(b) by 4 days.

(21) Appl. No.: 17/510,628

(22) Filed: Oct. 26, 2021

(65) Prior Publication Data

US 2022/0136114 A1 May 5, 2022

Related U.S. Application Data

(60) Provisional application No. 63/107,756, filed on Oct. 30, 2020.

(51) Int. Cl.
*C23F 13/16* (2006.01)
*B08B 7/02* (2006.01)

(52) U.S. Cl.
CPC .............. *C23F 13/16* (2013.01); *B08B 7/028* (2013.01)

(58) Field of Classification Search
CPC ... C23F 13/02–13/22; C23F 2213/10–2213/30
See application file for complete search history.

(56) References Cited

U.S. PATENT DOCUMENTS

| | | | | | |
|---|---|---|---|---|---|
| 4,087,742 | A * | 5/1978 | Khoo | G01N 17/02 | 204/196.15 |
| 8,226,812 | B2 * | 7/2012 | Nelvig | C23F 13/04 | 204/196.07 |
| 2010/0042389 | A1 * | 2/2010 | Farruggia | G02B 27/0006 | 134/184 |
| 2020/0348049 | A1 * | 11/2020 | Knoeppel | F24H 1/203 | |
| 2021/0189570 | A1 * | 6/2021 | Al-Khaldi | C23F 13/06 | |

FOREIGN PATENT DOCUMENTS

| | | | | |
|---|---|---|---|---|
| DE | 20318981 U1 * | 3/2004 | | C23F 13/04 |
| EP | 0383204 A1 * | 2/1990 | | C23F 13/08 |

* cited by examiner

*Primary Examiner* — Alexander W Keeling
(74) *Attorney, Agent, or Firm* — Foley & Lardner LLP

(57) ABSTRACT

A self-cleaning anode system for cathodic protection of equipment including a tank in which a liquid to be processed is located. The anode system includes a self-cleaning anode having a titanium body with a catalytic coating thereof. The anode includes at least one piezoelectric transducer for producing ultrasonic vibrations and coupling those vibrations to the catalytic coating on the anode to displace or dislodge any fouling deposits that may have accumulated on the anode during normal its normal operation in cathodically protecting the tank.

22 Claims, 2 Drawing Sheets

SELF-CLEANING ANODE FOR CATHODIC PROTECTION SYSTEMS, CATHODIC PROTECTION SYSTEMS INCLUDING THE SAME, AND METHODS OF USE

CROSS-REFERENCE TO RELATED APPLICATIONS

This application claims priority under 35 U.S.C. § 119(e) of Provisional Application Ser. No. 63/107,756 filed on Oct. 30, 2020 entitled Self-Cleaning Anode For Cathodic Protection Systems, Cathodic Protection Systems Including The Same And Methods, the entire disclosure of that application is incorporated by reference herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

This invention relates generally to cathodic protection systems where the anode may be subject to fouling and more particularly to self-cleaning anode systems for cathodic protection in these fouling applications, and method of using the same. One such application is process equipment in the oil and gas industry.

BACKGROUND OF THE INVENTION

Cathodic protection systems have been used to protect process equipment in the oil and gas industry. One such application is the cathodic protection of oil/water separators, knock out vessels and other similar oil processing equipment that is used to process crude oil/produced water emulsions. These vessels are used to separate produced water from oil, as almost all oil production results in mixture of crude oil and water being extracted in a mixed emulsion that must be separated with the water being disposed of and the crude oil being transported for further processing. During the separation process, the produced water is heavier than the crude oil and is generally quite corrosive. Ultimately during the separation process, the crude oil rises and the produced water sinks forming distinct layers. It is this produced water layer where the cathodic protection is required to protect the vessel interior from corrosion. This involves installing one or more anodes through the wall of the vessel, or from the open top of the vessel into this saltwater zone and discharging current off the anode. The anodes often used are large diameter galvanic anodes that have a short service life necessitating frequent replacement.

The use of longer life impressed current mixed metal oxide (MMO) anodes have been tried but one of the challenges is that these anodes struggle with any upset or startup conditions that result in the anode being exposed to the oil/water emulsion or the separated crude oil. Once fouled, (e.g., coated with oil) these anodes are prone to high resistance and cannot discharge enough current to protect the structure. In some cases, the anodes are subject to rapid failure as all the current is discharged off of a very diminished area exceeding the MMO anode's maximum allowable current density for discharging current and resulting in coating damage and accelerated corrosion of the underlying titanium anode substrate.

Accordingly, a need exists for an anode which is self-cleaning, and for a cathodic protection system which makes use of an anode which can be operated to automatically self-clean itself at desired periods of time. The subject invention addresses those needs.

All references cited and/or identified herein are specifically incorporated by reference herein.

SUMMARY OF THE INVENTION

In accordance with one aspect of this invention there is provided a self-cleaning anode for cathodic protection of equipment including a tank or other structure in which a liquid to be processed is located. At least a portion of the self-cleaning anode is configured to be immersed in the liquid to be processed. The self-cleaning anode comprises a body, a catalytic coating and at least one piezoelectric transducer. The body is formed of titanium and has an exterior surface, at least a portion of which is configured to be immersed in the liquid to be processed and is subject to fouling by fouling deposits accumulating thereon when immersed in the liquid to be processed. The body is configured to be connected to an electrical conductor to discharge electrical current off of at least a portion of the self-cleaning anode when at least a portion of the self-cleaning anode is immersed in the liquid to be processed. The catalytic coating is disposed on at least a portion of the exterior surface. The at least one piezoelectric transducer is coupled to the body and configured to be electrically coupled to an electrical circuit for receipt of electrical energy to cause the at least one piezoelectric transducer to vibrate at an ultrasonic frequency to apply ultrasonic vibrations to the mixed catalytic coating, whereupon the ultrasonic vibrations displace the fouling deposits (e.g., oil and petroleum byproducts) from the catalytic coating.

In accordance with one preferred aspect of the self-cleaning anode, the body comprises a box having a top wall. The top wall having an outer surface on which the mixed metal oxide coating is located and an interior chamber in which the at least one piezoelectric transducer is located.

In accordance with another preferred aspect of the self-cleaning anode, the body comprises an elongated resonator rod having a pair of ends, and wherein the at least one piezoelectric transducer is coupled to at least one of the ends of the rod.

In accordance with another preferred aspect of the self-cleaning anode, each of the pair of ends includes at least one piezoelectric transducer coupled thereto.

In accordance with another preferred aspect of the self-cleaning anode, the elongated resonator rod has a central longitudinal axis, and a central cavity extending along the central longitudinal axis.

In accordance with another preferred aspect of the self-cleaning anode, the ultrasonic frequency is in the range of 25 kHz to 40 kHz.

In accordance with another preferred aspect of the self-cleaning anode, the ultrasonic frequency is approximately 40 kHz.

In accordance with another preferred aspect of the self-cleaning anode, the catalytic coating is selected from the group consisting of an iridium-based mixed metal oxide coating, a ruthenium-based mixed metal oxide coating and a platinum catalytic coating.

In accordance with another preferred aspect of the self-cleaning anode, the mixed metal oxide coating is more than approximately 6 $mg/m^2$ of coating loading.

Another aspect of this invention is system for cleaning an anode in a tank or other structure in which a liquid to be processed is located. The system comprises a controller, a first electrical conductor, a second electrical conductor, and a self-cleaning anode. The first electrical conductor is configured to be connected to a cathodic protection system during a first interval of time under control of the controller. The second electrical conductor is configured to be connected to an electrical circuit providing an electrical signal of a desired frequency during a second interval of time under control of the controller. The self-cleaning anode is configured to be immersed in the liquid to be processed. The self-cleaning anode comprises a body, a catalytic coating and at least one piezoelectric transducer. The body is formed of titanium and has an exterior surface, at least a portion of which is configured to be immersed in the liquid to be processed and is subject to fouling by fouling deposits accumulating thereon when immersed in the liquid. The body is connected to the first electrical conductor to discharge electrical current off of the at least a portion of the self-cleaning anode to the cathodic protection system during the first interval of time when the at least a portion of the self-cleaning anode is immersed in the liquid. The catalytic coating is disposed on at least a portion of the exterior surface. The at least one piezoelectric transducer is coupled to the body and is connected to the second electrical connector, whereupon the electrical signal of a desired frequency is provided to the at least one piezoelectric transducer causes the at least one piezoelectric transducer to produce ultrasonic vibrations and apply the ultrasonic vibrations to the catalytic coating during the second interval of time when the at least a portion of the self-cleaning anode is immersed in the liquid to be processed to displace the fouling deposits from the catalytic coating during the second interval of time.

In accordance with one preferred aspect of the system for cleaning an anode in a tank or other structure in which a liquid to be processed is located, the body comprises a box having a top wall. The top wall has an outer surface on which the catalytic coating is located and an interior chamber in which the at least one piezoelectric transducer is located.

In accordance with another preferred aspect of the system for cleaning an anode in a tank or other structure in which a liquid to be processed is located, the body comprises an elongated resonator rod having a pair of ends, and wherein the at least one piezoelectric transducer is coupled to at least one of the ends of the rod.

In accordance with another preferred aspect of the system for cleaning an anode in a tank or other structure in which a liquid to be processed is located, each of the pair of ends includes at least one piezoelectric transducer coupled thereto.

In accordance with another preferred aspect of the system for cleaning an anode in a tank or other structure in which a liquid to be processed is located, the elongated resonator rod has a central longitudinal axis, and a central cavity extending along the central longitudinal axis.

In accordance with another preferred aspect of the system for cleaning an anode in a tank or other structure in which a liquid to be processed is located, the ultrasonic frequency is in the range of 25 kHz to 40 kHz.

In accordance with another preferred aspect of the system for cleaning an anode in a tank or other structure in which a liquid to be processed is located, the ultrasonic frequency is approximately 40 kHz.

In accordance with another preferred aspect of the system for cleaning an anode in a tank or other structure in which a liquid to be processed is located, the catalytic coating is selected from the group consisting of an iridium-based mixed metal oxide coating, a ruthenium-based mixed metal oxide coating, and a platinum catalytic.

In accordance with another preferred aspect of the system for cleaning an anode in a tank or other structure in which a liquid to be processed is located, the mixed metal oxide coating is more than approximately 6 $mg/m^2$ of the coating load.

Another aspect of this invention is a method for cathodic protection of processing equipment including a tank or other structure in which a liquid to be processed is located, comprising. The method comprises providing a self-cleaning anode comprising a body and at least one piezoelectric transducer coupled to the body. The body is formed of titanium and has an exterior surface in the form of a mixed metal oxide coating disposed on at least a portion of the exterior surface. At least a portion of the self-cleaning anode is immersed in the liquid to be processed. The at least a portion of the self-cleaning anode is subject to fouling by fouling deposits accumulating thereon when immersed in the liquid to be processed. The self-cleaning anode is coupled to a cathodic protection system, whereupon the self-cleaning anode discharges electrical current off of the at least a portion of the self-cleaning anode to the cathodic protection system during a first interval of time when the at least a portion of the self-cleaning anode is immersed in the liquid to be processed. The at least one piezoelectric transducer is coupled to an electrical circuit providing an electrical signal of a desired frequency during a second interval of time when the at least a portion of the self-cleaning anode is immersed in the liquid to be processed, whereupon the at least one piezoelectric transducer produces ultrasonic vibrations and applies the ultrasonic vibrations to the mixed metal oxide coating during the second interval of time when the at least a portion of the self-cleaning anode is immersed in the liquid to be processed to displace the fouling deposits from the mixed metal oxide coating during the second interval of time.

In accordance with one preferred aspect of the method for cathodic protection of processing equipment including a tank or other structure in which a liquid to be processed is located, the first and second periods of time are different time periods, which do not overlap.

In accordance with another preferred aspect of the method for cathodic protection of processing equipment including a tank or other structure in which a liquid to be processed is located, the self-cleaning anode is electrically isolated from the cathodic protection system during the second interval of time.

In accordance with another preferred aspect of the method for cathodic protection of processing equipment including a tank or other structure in which a liquid to be processed is located, the self-cleaning anode is electrically isolated from the electrical circuit providing an electrical signal of a desired frequency during the first interval of time.

In accordance with another preferred aspect of the method for cathodic protection of processing equipment including a tank or other structure in which a liquid to be processed is located, the isolation of the self-cleaning anode from the cathodic protection system and from the electrical circuit providing an electrical signal of a desired frequency is controlled automatically by a controller.

In accordance with another preferred aspect of the method for cathodic protection of processing equipment including a tank or other structure in which a liquid to be processed is located, the equipment is selected from the group consisting of oil/water separators, knock out vessels and other oil processing equipment that is used to process crude oil/produced water emulsions.

DETAILED DESCRIPTION OF THE PREFERRED EMBODIMENT

Figure 1:
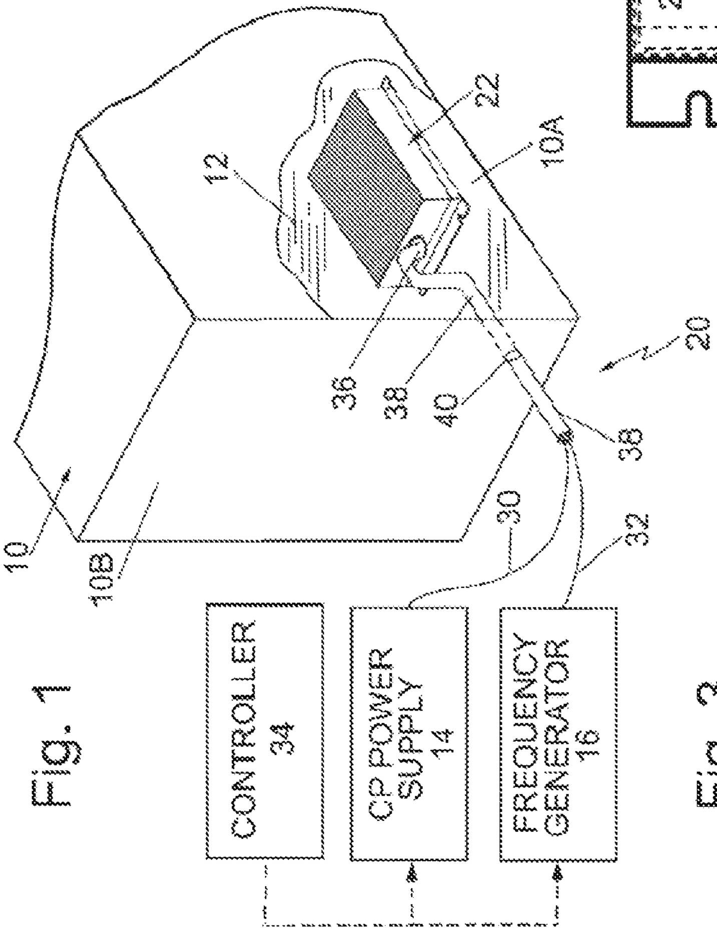
FIG. 1 is an isometric view of a portion of a tank of one exemplary piece of equipment, e.g., an oil/water separation unit, in which one exemplary embodiment of self-cleaning anode constructed in accordance with this invention is mounted for the cathodic protection of the tank.
Figure 2:
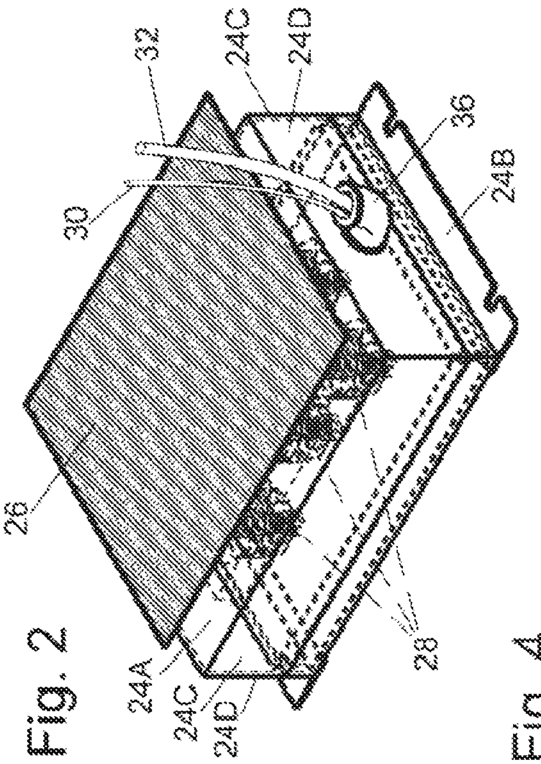
FIG. 2 is an enlarged exploded isometric view of the exemplary self-cleaning anode shown in FIG. 1.
Figure 3:
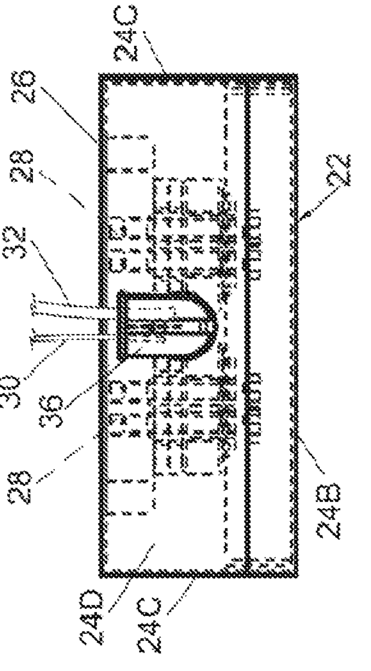
FIG. 3 is an enlarged side elevation view of one end of the self-cleaning anode shown in FIGS. 1 and 2.

Referring now to the various figures of the drawing wherein like reference characters refer to like parts, there is shown at 20 in FIG. 1 one exemplary embodiment of a self-cleaning anode system 20 including a self-cleaning anode 22 forming a portion of a cathodic protection system for the cathodically protecting liquid processing equipment including a tank 10 (or other structure) in which a liquid to be processed is located. That equipment can be of any type. One particular type is process equipment in the oil and gas industry, such oil/water separators, knock-out vessels and other similar oil processing equipment used to process crude oil/produced water emulsions. It should be noted that the tank 10 shown in FIG. 1 is merely one example of various shaped and sized tanks or other structures holding the liquid to be processed for which the subject invention can be used.

The self-cleaning anode 22 is designed so that at least a portion of it is located within the tank 10 and immersed in the liquid 12 to be processed. When in the liquid 12 the outer surface of the self-cleaning anode, like other cathodic protection anodes immersed in a liquid to be processed, is subject to becoming fouled by the accumulation of fouling deposits, e.g., oil, thereon. Such fouling action, unless impeded, will over time degrade the ability of the anode to discharge electrical current off of it and hence prevent the cathodic protection system from working properly.

The self-cleaning anode of the subject invention is configured so that periodically it can be operated to clean itself of the accumulating fouling deposits. The self-cleaning anode 22 basically comprises a body 24 that has an outer surface, a portion of which is in the form of a catalytic coating 26. Unlike conventional anodes, the self-cleaning anode 22 of this invention includes at least one piezoelectric transducer 28 coupled to the body 24. The at least one piezoelectric transducer is configured to produce and apply ultrasonic vibrations to the body, whereupon any fouling deposits that had accumulated on the catalytic coating 26 will be dislodged by cavitation resulting from those ultrasonic vibrations.

The body 24 can be of various shapes and sizes depending upon the application and can be located at any desired location within the tank 10. In the exemplary embodiment shown in FIG. 1, the self-cleaning anode 22 is shown located and mounted on the floor 10A (or bottom wall) of the tank 10, so that it will be immersed in any processing liquid 12 that is introduced into the tank.

The body of the exemplary embodiment shown in FIGS. 1-4, is in the form of a hollow box-like housing, whose details will be described later. Suffice it for now to state that the box-like body includes at least one piezoelectric transducer is located in it. A portion of a first electrical conductor or cable 30 is electrically connected to the body at some internal connection point (not shown). The first electrical conductor or cable 30 includes another portion that is configured to be connected to a Cathodic Protect (CP) Power Supply 14 of the cathodic protection system to discharge electrical current off of the self-cleaning anode 22 when the cathodic protection system is in its normal operating mode. A second electrical conductor or cable 32 is electrically connected to the at least one piezoelectric transducer 28 and includes an end portion that is configured to be connected to a Frequency Generator 16. The Frequency Generator 16 is configured to provide an electrical signal of a desired frequency to the at least one piezoelectric transducer to cause it/them to vibrate at an ultrasonic frequency during selected time periods when normal operation of the cathodic protection system is interrupted and cleaning of the self-cleaning anode is to be accomplished. It is during those selected time periods, to be described later (each referred to hereinafter as the “self-cleaning period”, or the “self-cleaning cycle”, or the “self-cleaning mode”), that any fouling deposits that had accumulated on catalytic coating 26 will be dislodged by the operation of the at least one piezoelectric transducer.

The body 24 the embodiment shown in FIGS. 1-4 is preferably formed of titanium, which is very pure (e.g., approximately at least 99% titanium) and has a top wall 24A (FIG. 2), a flanged bottom wall 24B, a pair of side walls 24C, and a pair of end walls 24D. The outer surface of the top wall is in the form of the catalytic coating 26. The catalytic coating is preferably a mixed metal oxide (MMO) coating (e.g., an iridium-based mixed metal oxide coating or a ruthenium-based mixed metal oxide coating), or a platinum catalytic coating, like used in prior art cathodic protection anodes. In accordance with one preferred embodiment the thickness of the coating 26 is very thin, e.g., more than approximately 6 $mg/m^2$ of the coating load.

Figure 4:
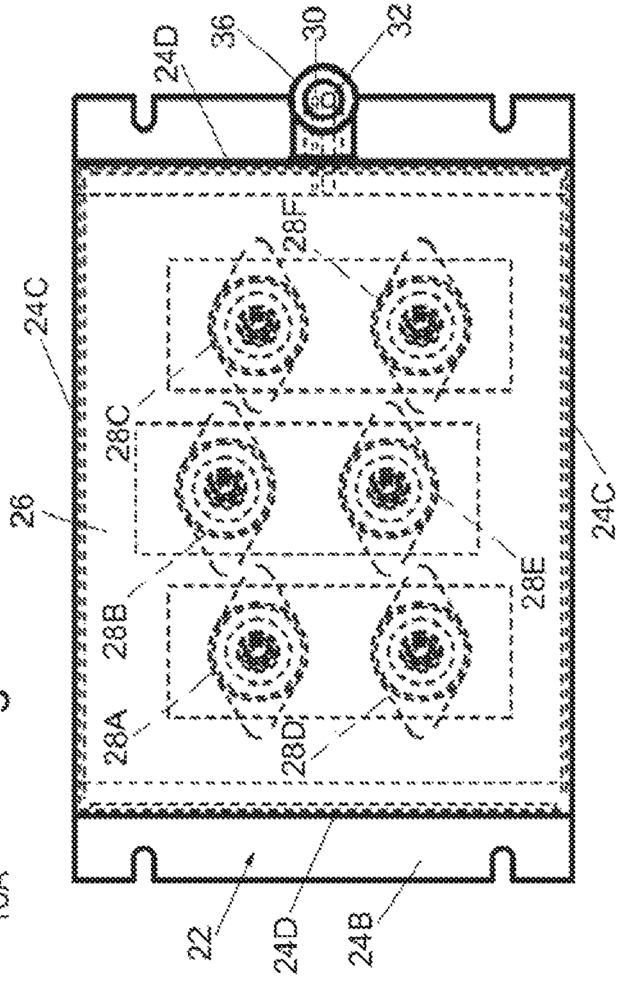
FIG. 4 is an enlarged top plan view of the self-cleaning anode shown in FIGS. 1-3.

As best seen in FIG. 4 the self-cleaning anode 22 of FIG. 1 includes a total of six piezoelectric transducers, namely, transducers 28A, 28B, 28C, 28D, 28E and 28F, each of which is fixedly mounted within the hollow interior of the box-like body 24. The mounting of the anode 22 within the tank 10 can be accomplished by securing the flanges of the bottom wall 24B to the floor 10A of the tank by any suitable means, e.g., screws, etc., (not shown).

Each of the transducers includes a portion that is coupled to the inner surface of the top wall 24A so that when energized the piezoelectric elements of the transducers vibrate to apply ultrasonic vibrations to the top wall 24A, which ultrasonic vibrations propagate through the top wall to the catalytic coating 26.

In accordance with one preferred embodiment of this invention each piezoelectric transducer is a conventional device, like those used in the Immersible Ultrasonic Transducers that are available from Crest Ultrasonics Corporation. Piezoelectric ultrasonic transducers of other manufacturers can be used for the subject invention, as well. Each of the piezoelectric transducers is connected to the cable 32, which as described above is configured to be connected to the Frequency Generator 16. The Frequency Generator 16 is also preferably a conventional device like the Ultrasonic Generators available from Crest Ultrasonics Corporation, but other frequency generators of other manufacturers can be used as well.

In any case it is preferred that the Frequency Generator be configured so that it provides electrical signals to the piezoelectric transducers to cause them to vibrate at a frequency in the range of approximately 20 kHz to approximately 100 kHz and preferably approximately 25 kHz to approximately 40 kHz. For applications involving processing crude oil/produced water emulsions a frequency of approximately 40 kHz is preferred.

It should be noted that other frequency ranges and other preferred frequencies can be implemented depending upon the type of processing liquid in which the self-cleaning anode of this invention is immersed.

In accordance with one preferred aspect of this invention and in order to establish the normal operating mode of the cathodic protection system and the self-cleaning mode, the self-cleaning anode system 20 includes a Controller 34. The Controller 34 is an electronic circuit that is configured and operative for interrupting the normal operation of the cathodic protection system (e.g., turning off the CP Power Supply 14 of the cathodic protection system) and initiating the self-cleaning mode (e.g., turning on the Frequency Generator 16). During the self-cleaning mode or cycle the Frequency Generator 16 applies electrical drive signals to the ultrasonic transducers 30A-30F to cause them to operate (vibrate at an ultrasonic frequency) to dislodge the accumulated fouling deposits from the catalytic coating 26 of the anode 22.

The initiation of the self-cleaning mode or cycle can be accomplished under control of the Controller 34 periodically, e.g., self-cleaning for a time period of 10 minutes at a prescribed time once a day. Alternatively, the Controller may control the initiation of the self-cleaning mode or cycle on an as-needed basis, i.e., upon detection of fouling of the anode. That alternative operation can be accomplished by the Controller 34 monitoring the resistance of the anode 22, whereupon if the anode's resistance rises to a predetermined value (thereby indicating that the anode has become fouled), the Controller 34 will initiate the self-cleaning mode or cycle. Coincident with the initiation of the self-cleaning mode or cycle, the Controller 34 will interrupt the normal mode of operation of the self-cleaning anode by turning off the CP Power Supply 14. Once the Controller determines that the self-cleaning anode has been cleaned sufficiently, i.e., its resistance has dropped below a predetermined threshold, the CP Power Supply 14 will be turned back on by the Controller 34 to initiate the normal mode of operation. At the same time the Controller 34 will terminate the self-cleaning mode or cycle, i.e., turning off the Frequency Generator 16. The electrical signals from the Controller 34 to the CP Power Supply 14 and the Frequency Generator 16 to control their operation (i.e., turn them off and on), are shown schematically by the broken lines with arrowheads in FIG. 1.

As best seen in FIG. 1, the cables or conductors 30 and 32 extend out of the box-like housing 24 via an elbow shaped conduit 36 and an associated conduit 38. The conduit 38 passes through a mount (not shown), e.g., a flange with a sealing gasket, a threaded connector, etc., forming a pressure sealed opening 40 in a side wall 10B of the tank 10 from which the cable or conductor 30 connects to the CP Power Supply 14 and the cable or conductor 32 connects to the Frequency Generator 16.

It should be noted that the number and placement of piezoelectric transducers utilized in the anode 22 depends upon the application, with the goal of enhancing the creation of a homogenous sonic field across the entire top surface of the anode. Moreover, the use of the catalytic coating 26 on only the top wall 24A of the box-like housing 24 is merely exemplary of various configurations for the catalytic coating. In this regard, the catalytic coating 26 can be applied to all of the walls of the housing which will be exposed to the processing liquid 12, or can be applied to selected ones of the walls depending upon circumstances and the shape and size of the housing 24.

Figure 5:
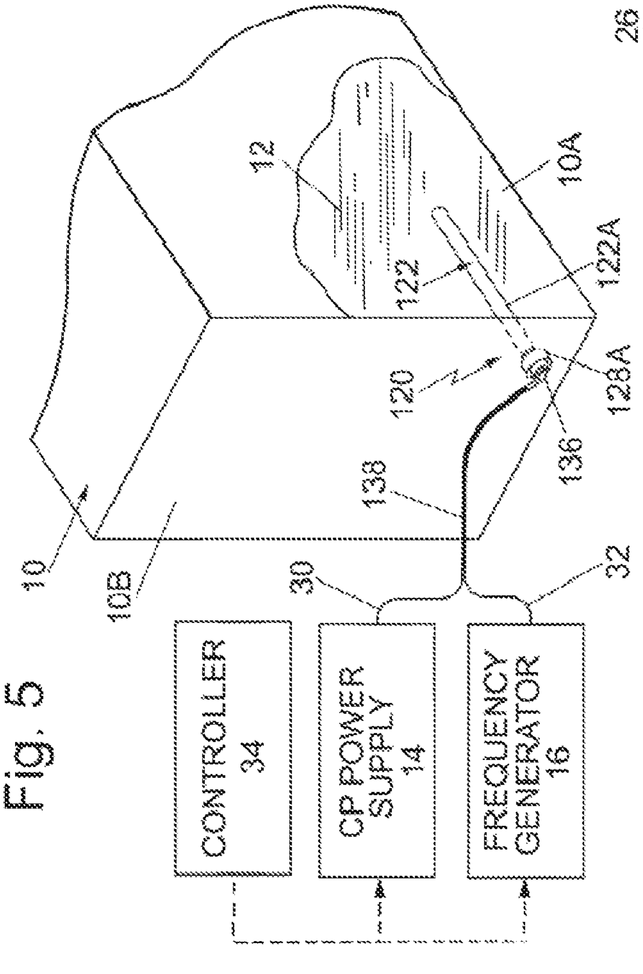
FIG. 5 is an isometric view of a portion of a tank of the exemplary piece of equipment, e.g., an oil/water separation unit, like shown in FIG. 1, but with another exemplary embodiment of self-cleaning anode constructed in accordance with this invention is mounted for the cathodic protection of the tank.

FIG. 5 shows another embodiment of a self-cleaning anode system 120 including an alternative self-cleaning anode 122 forming a portion of a cathodic protection system for cathodically protecting liquid processing equipment like that of FIG. 1. In the interest of brevity the common components of the system 120 and the system 20 will be given the same reference numbers and the details of their construction, arrangement and operation will not be reiterated. Thus, as can be seen the anode system 120 includes the heretofore identified Frequency Generator 16 and Controller 34. The self-cleaning anode 122 basically comprises an elongated, cylindrical body 122A having a pair of ends 122B and 122C. The end 122C is closed. The body 122A is formed of the same material as that making up the body 22 (i.e., pure titanium), whose outer periphery is coated with a catalytic coating 126 formed of the same material as the catalytic coating 26. The coating 126 is of the same thickness as the coating 26, i.e., more than approximately 6 $mg/m^2$ of the coating load. The body 122A is constructed similarly to like that of resonator rod of a Single Push Transducer available from Crest Ultrasonics Corporation, except for the titanium material making up the body and its catalytic coating. An ultrasonic drive head 128 is mounted at the end 122B of the body 122A. The ultrasonic drive head 128 includes a piezoelectric ultrasonic transducer, like that found in the Crest Ultrasonics Corporation Single Push Transducer. The resonator rod includes a central cavity 122D extending longitudinally along the central longitudinal axis of the body from ultrasonic drive head 128 to a point adjacent the closed end 122C.

The self-cleaning anode 122 is mounted on the tank 10 so that the drive head 128 is located outside the tank closely adjacent the side wall 10B, and with a portion of the anode body passing through a pressure sealed opening in that side wall so that the remainder of the anode is located within the interior the tank. The means for mounting the anode on the tank through the pressure sealed opening can take various forms, e.g., can be a flanged mount with a seal or gasket, a threaded connection, etc. In any case, one portion of an electrical conductor or cable 30 is electrically connected to the body 122 at some internal connection point (not shown) and extends out of an elbow conduit 136 at outermost end of the drive head 128. One portion of another electrical conductor 32 is electrically connected to the piezoelectric transducer of the ultrasonic drive head 128 at some internal connection point (not shown) and also extends out of the elbow 136. The two conductors or cables 30 and 32 exit the elbow 136 within a braided protective sleeve 138. The end of the conductor or cable 30 exiting from the braided sleeve 138 is electrically connected to the CP Power Supply 14, while the end of the conductor or cable 32 exiting from the protective sleeve is electrically connected to the Frequency Generator 16.

The self-cleaning anode 122 operates in the same modes or operation as the self-cleaning anode 22, under control of the Controller 34. In particular, when the Controller determines that the self-cleaning anode should operate in the cleaning mode or cycle, the Controller will provide an appropriate signal to the CP Power Supply 14 to turn it off, thereby terminating the normal cathodic protection operation of the anode, and at the same time provide an appropriate signal to the Frequency Generator 16 to turn it on. When the Frequency Generator is turned on it will provide the electrical signals to the ultrasonic transducer in the drive head 128 to cause it to vibrate at the desired ultrasonic frequency like that of the self-cleaning anode system 20, whereupon the vibrations will be coupled through the resonator rod 122A and its cavity 122D to the catalytic coating 126 on the resonator rod to dislodge the accumulated fouling deposits from that coating. Once the cleaning mode cycle or mode is completed, the Controller 34 will turn the Frequency Generator 16 off, and will turn the CP Power Supply 14 on, whereupon normal cathodic protection operation will re-commence.

Figure 7:
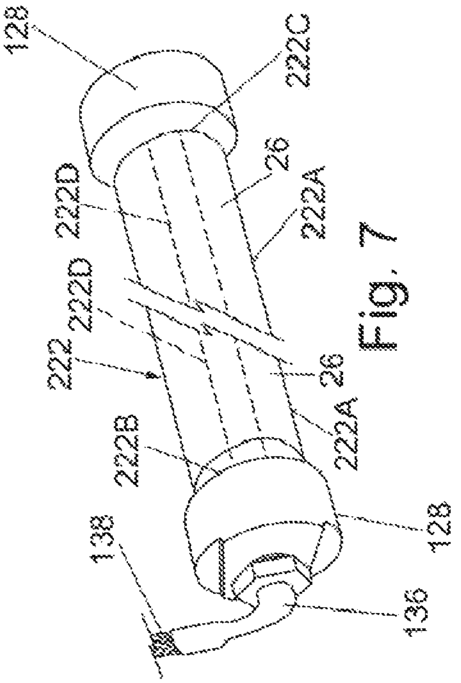
FIG. 7 is a reduced isometric view of another exemplary embodiment of a self-cleaning anode constructed in accordance with this invention.
Figure 6:
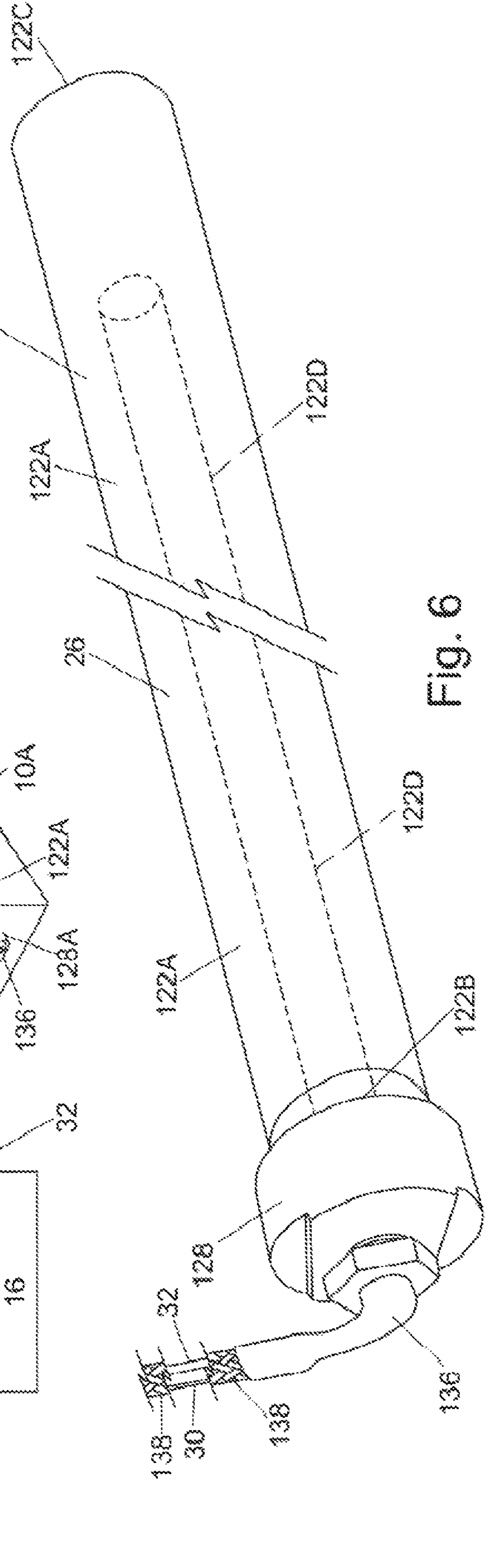
FIG. 6 is an enlarged isometric view of the exemplary self-cleaning anode shown in FIG. 5.

FIG. 7 shows an alternative embodiment of a self-cleaning anode 222 constructed in accordance with this invention. The self-cleaning electrode 222 can form a portion of the heretofore-identified self-cleaning anode system 120 in lieu of the self-cleaning anode 122. In the interest of brevity the common components of the self-cleaning anode 222 and 122 will be given the same reference numbers and their construction, arrangement and operation will not be reiterated. Thus, as can be seen in FIG. 7, the self-cleaning anode 222 basically comprises an elongated, cylindrical body 222A having a pair of ends 222B and 222C. The body 222A is formed of the same material as that making up the body 122 (i.e., pure titanium), whose outer periphery is coated with a catalytic coating 126 formed of the same material as the catalytic coating 26. The coating 126 is of the same thickness as the coating 26, i.e., more than approximately 6 $mg/m^2$ of the coating load. The body 222A is constructed similarly to like that of resonator rod of the Push-Pull Transducer available from Crest Ultrasonics Corporation, except for the titanium material making up the body and its catalytic coating. A first ultrasonic drive head 128 is mounted at the end 222B and a second ultrasonic drive head 128 is mounted at the end 222C. Each ultrasonic drive head 128 includes a piezoelectric ultrasonic transducer, like that found in the Crest Ultrasonics Corporation Push-Pull Transducer. The resonator rod includes a central cavity 222D extending longitudinally along the central longitudinal axis of the body between the two ultrasonic drive heads 128.

The self-cleaning anode 222 is mounted on the tank 10 in the same manner as the self-cleaning anode 122 is mounted on that tank, and is connected to the CP Power Supply 14 and to the Frequency Generator 16 in the same manner as well. Operation of the self-cleaning anode 222 is the same as that described with respect the self-cleaning anode 122, except that during the self-cleaning mode of operation the fouling-removing vibrations are provided by the two ultrasonic drive heads 128. Thus the two drive heads operate induce longitudinal pulses in the resonator rod 222A at their respective points of attachment, thereby enhancing the creation of a homogenous sonic field along the resonator rod.

It should be noted that the exemplary embodiments of the systems 20, 120 and 220 are but a few examples of various structures and configurations that can be made in accordance with this invention to carry out its ends. Moreover, the methods of use of the self-cleaning anodes and the systems in which they are used as disclosed above should not be deemed to constitute all of the methods and systems of the subject invention, nor should the use of such methods and systems be limited to cathodic protection of oil/water separators, knock out vessels and other similar oil processing equipment that is used to process crude oil/produced water emulsions. Thus, the subject invention is contemplated for use in other applications where similar types of fouling is an issue.

Without further elaboration the foregoing will so fully illustrate our invention that others may, by applying current or future knowledge, adopt the same for use under various conditions of service.

We claim:

1. A self-cleaning anode for cathodic protection of equipment including a tank or other structure in which a liquid to be processed is located, said self-cleaning anode comprising:

a body formed of titanium and comprising a box-like housing having a top wall, a flanged bottom wall, and an interior chamber, said flanged bottom wall being configured to mount said self-cleaning anode directly to an interior surface of the tank or other structure, said top wall having an exterior surface, at least a portion of which is configured to be immersed in the liquid to be processed and is subject to fouling by fouling deposits accumulating thereon when said at least a portion of said body is immersed in the liquid to be processed, said body being configured to be connected to an electrical conductor configured to conduct electrical current to said self-cleaning anode to discharge electrical current off of said at least a portion of said self-cleaning anode for processing the liquid in the tank or the other structure;

a catalytic coating disposed on said at least a portion of said exterior surface; and at least one piezoelectric transducer located within said interior chamber and coupled to said top wall and configured to be electrically coupled to an electrical circuit for receipt of electrical energy to cause said at least one piezoelectric transducer to vibrate at an ultrasonic frequency to apply ultrasonic vibrations to said catalytic coating, whereupon said ultrasonic vibrations displace the fouling oil deposits from said catalytic coating.

2. A self-cleaning anode for cathodic protection of equipment including a tank or other structure in which a liquid to be processed is located, wherein at least a portion of said self-cleaning anode is configured to be immersed in the liquid to be processed, said self-cleaning anode comprising:

a body comprising an elongated resonator rod having a pair of ends, said body being formed of titanium and having an exterior surface, at least a portion of which is configured to be immersed in the liquid to be processed and is subject to fouling by fouling deposits accumulating thereon when immersed in the liquid to be processed, said body being configured to be connected to an electrical conductor to discharge electrical current off of said at least a portion of said self-cleaning anode when said at least a portion of said self-cleaning anode is immersed in the liquid to be processed;

a catalytic coating disposed on at least a portion of said exterior surface;

at least one piezoelectric transducer is coupled to at least one of said ends of said rod and configured to be electrically coupled an electrical circuit for receipt of electrical energy to cause said at least one piezoelectric transducer to vibrate at an ultrasonic frequency to apply ultrasonic vibrations to said catalytic coating, whereupon said ultrasonic vibrations displace the fouling deposits from said mixed metal oxide coating.

3. The self-cleaning anode of claim 2, wherein each of said pair of ends includes at least one piezoelectric transducer coupled thereto.

4. The self-cleaning anode of claim 2, wherein said elongated resonator rod has a central longitudinal axis, and a central cavity extending along said central longitudinal axis.

5. The self-cleaning anode of claim 1, wherein said ultrasonic frequency is in the range of approximately 20 kHz to approximately 100 kHz.

6. The self-cleaning anode of claim 5, wherein said ultrasonic frequency is approximately 40 KHz.

7. The self-cleaning anode of claim 1, wherein said catalytic coating is selected from the group consisting of an iridium-based mixed metal oxide coating, a ruthenium-based mixed metal oxide coating, and a platinum catalytic coating.

8. The self-cleaning anode of claim 7, wherein said mixed metal oxide coating is more than approximately 6 mg/m2 of the coating load.

9. A system for cleaning a self-cleaning anode for cathodic protection of equipment including a tank or other structure having an interior in which a liquid to be processed is located, the interior being subject to corrosion from the liquid, said system comprising:

a controller;

a first electrical conductor configured to be connected to a cathodic protection system during a first interval of time under control of said controller;

a second electrical conductor configured to be connected to an electrical circuit providing an electrical signal of a desired frequency during a second interval of time under control of said controller; and a self-cleaning anode comprising:

a body formed of titanium and comprising a box-like housing having a top wall, a flanged bottom wall, and an interior chamber, said flanged bottom wall being configured to mount said self-cleaning anode directly to an interior surface of the tank or other structure, said top wall having an exterior surface, at least a portion of which is configured to be immersed in the liquid to be processed and is subject to fouling by fouling deposits accumulating thereon when said at least a portion of said body is immersed in the liquid to be processed, said body being connected to said first electrical conductor to discharge electrical current off of said at least a portion of said self-cleaning anode to the cathodic protection system during said first interval of time when said at least a portion of said self-cleaning anode is immersed in the liquid to be processed;

a catalytic coating disposed on at least a portion of said exterior surface; and at least one piezoelectric transducer located within said interior chamber and coupled to said body top wall, said at least one piezoelectric transducer being connected to said second electrical connector, whereupon said electrical signal of a desired frequency is provided to said at least one piezoelectric transducer to cause said at least one piezoelectric transducer to produce ultrasonic vibrations and apply said ultrasonic vibrations to said catalytic coating during said second interval of time when said at least a portion of said self-cleaning anode is immersed in the liquid to be processed to displace the fouling deposits from said catalytic coating during said second interval of time.

10. A system for cleaning an anode in a tank or other structure in which a liquid to be processed is located, said system comprising:

a controller;

a first electrical conductor configured to be connected to a cathodic protection system during a first interval of time under control of said controller;

a second electrical conductor configured to be connected to an electrical circuit providing an electrical signal of a desired frequency during a second interval of time under control of said controller; and a self-cleaning anode configured to be immersed in the liquid to be processed, said self-cleaning anode comprising:

a body formed of titanium and having an exterior surface, at least a portion of which is configured to be immersed in the liquid to be processed and is subject to fouling by fouling deposits accumulating thereon when immersed in the liquid to be processed, said body being connected to said first electrical conductor to discharge electrical current off of said at least a portion of said self-cleaning anode to the cathodic protection system during said first interval of time when said at least a portion of said self-cleaning anode is immersed in the liquid to be processed, wherein said body comprises an elongated resonator rod having a pair of ends;

a catalytic coating disposed on at least a portion of said exterior surface; and at least one piezoelectric transducer coupled to at least one of said ends of said rod, said at least one piezoelectric transducer being connected to said second electrical connector, whereupon said electrical signal of a desired frequency is provided to said at least one piezoelectric transducer to cause said at least one piezoelectric transducer to produce ultrasonic vibrations and apply said ultrasonic vibrations to said catalytic coating during said second interval of time when said at least a portion of said self-cleaning anode is immersed in the liquid to be processed to displace the fouling deposits from said catalytic coating during said second interval of time.

11. The system of claim 10, wherein each of said pair of ends includes at least one piezoelectric transducer coupled thereto.

12. The system of claim 10, wherein said elongated resonator rod has a central longitudinal axis, and a central cavity extending along said central longitudinal axis.

13. The system of claim 9 wherein said ultrasonic frequency is in the range of approximately 20 kHz to approximately 100 kHz.

14. The system of claim 13, wherein said ultrasonic frequency is approximately 40 kHz.

15. The system claim 9, wherein said catalytic coating is selected from the group consisting of an iridium-based mixed metal oxide coating, a ruthenium-based mixed metal oxide coating, and a platinum catalytic coating.

16. The system of claim 15, wherein said mixed metal oxide coating is more than approximately 6 mg/m2 of the coating load.

17. A method for cathodic protection of processing equipment, equipment including a tank or other structure having an interior in which a liquid to be processed is located, the interior being subject to corrosion from the liquid, said method including the steps of:

providing a self-cleaning anode comprising a body and at least one piezoelectric transducer coupled to said body, said body being formed of titanium and having an exterior surface in the form of a catalytic coating disposed on at least a portion of said exterior surface, said exterior surface comprising a top wall of a box-like housing or an exterior surface of a resonator rod, said box-like housing having a top wall, a flanged bottom wall, and an interior chamber, said resonator rod having a pair of ends, said at least one piezoelectric transducer being located in said interior chamber and coupled to an inner surface of said top wall of said box-like housing or at least one of said pair of ends of said resonator rod;

immersing said at least a portion of said self-cleaning anode in the liquid to be processed in the tank or other structure of the equipment, whereupon said box-like housing is mounted directly to an interior surface of said tank or other structure by said flanged bottom wall or said resonator rod is mounted within said interior of said tank or other structure, said at least a portion of said self-cleaning anode being subject to fouling by fouling deposits accumulating thereon when immersed in said liquid to be processed;

coupling said self-cleaning anode to a cathodic protection system, whereupon said self-cleaning anode discharges electrical current off of said at least a portion of said self-cleaning anode to said cathodic protection system during a first interval of time when said at least a portion of said self-cleaning anode is immersed in said crude oil/produced water emulsion liquid to be processed; and coupling said at least one piezoelectric transducer to an electrical circuit providing an electrical signal of a desired frequency during a second interval of time when said at least a portion of said self-cleaning anode is immersed in said liquid to be processed, whereupon said at least one piezoelectric transducer produces ultrasonic vibrations and applies said ultrasonic vibrations to said catalytic coating during said second interval of time when said at least a portion of said self-cleaning anode is immersed in said liquid to be processed to displace the fouling deposits from said catalytic coating during said second interval of time.

18. The method of claim 17, wherein said first and second periods of time are different time periods, which do not overlap.

19. The method of claim 17, wherein said self-cleaning anode is electrically isolated from said cathodic protection system during said second interval of time.

20. The method of claim 17, wherein said self-cleaning anode is electrically isolated from said electrical circuit providing an electrical signal of a desired frequency during said first interval of time.

21. The method of claim 19, wherein said self-cleaning anode is electrically isolated from said electrical circuit providing an electrical signal of a desired frequency during said first interval of time.

22. The method of claim 21, wherein said isolation of said self-cleaning anode from said cathodic protection system and from said electrical circuit providing an electrical signal of a desired frequency is controlled automatically by a controller.

* * * * *